United States Patent
Yang et al.

(10) Patent No.: US 12,308,049 B2
(45) Date of Patent: May 20, 2025

(54) DECISION FEEDBACK EQUALIZATION IN SEMICONDUCTOR DEVICES

(71) Applicant: Macronix International Co., Ltd., Hsinchu (TW)

(72) Inventors: Shang-Chi Yang, Changhua County (TW); Chun-Hao Tsai, Taoyuan (TW); Tung-Yu Li, Taoyuan (TW)

(73) Assignee: Macronix International Co., Ltd., Hsinchu (TW)

( * ) Notice: Subject to any disclaimer, the term of this patent is extended or adjusted under 35 U.S.C. 154(b) by 53 days.

(21) Appl. No.: 18/341,086

(22) Filed: Jun. 26, 2023

(65) Prior Publication Data

US 2024/0428822 A1    Dec. 26, 2024

(51) Int. Cl.
*G11B 20/10*    (2006.01)
*G11B 20/14*    (2006.01)

(52) U.S. Cl.
CPC .... *G11B 20/10037* (2013.01); *G11B 20/1423* (2013.01)

(58) Field of Classification Search
CPC ....... H04L 25/03057; H04L 2025/0349; H04L 25/03885; H04L 25/03343; H04L 25/03267; H04L 25/03146; H04L 1/0054; H04B 10/616; H04B 7/0845; H04B 10/6162; H04B 10/6161; H04B 7/0848; H04B 10/6165; H04B 10/079; H04B 10/40; H04W 84/12; H04W 24/08; H04W 72/0453; H04W 4/80; H04W 72/23; H04W 24/00; H04W 24/02; H04W 72/04

USPC ........................................................ 375/233
See application file for complete search history.

(56) References Cited

U.S. PATENT DOCUMENTS

| | | | |
|---|---|---|---|
| 8,964,825 B2 | 2/2015 | Beukema et al. | |
| 11,271,782 B1* | 3/2022 | Anavangot | H04L 25/0272 |
| 2007/0047635 A1* | 3/2007 | Stojanovic | H04L 25/03006 375/229 |
| 2013/0108276 A1 | 5/2013 | Kikuchi | |
| 2016/0277219 A1* | 9/2016 | Venkatram | H04L 7/0062 |
| 2017/0085403 A1* | 3/2017 | Sun | H04L 25/0292 |
| 2019/0158082 A1* | 5/2019 | Lee | G11C 8/10 |
| 2021/0021448 A1* | 1/2021 | Beukema | H04L 25/0272 |
| 2024/0072773 A1* | 2/2024 | Na | H03K 3/017 |
| 2024/0106688 A1* | 3/2024 | Radhakrishnan | H04L 7/0062 |

* cited by examiner

*Primary Examiner* — Eva Y Puente
(74) *Attorney, Agent, or Firm* — Fish & Richardson P.C.

(57) ABSTRACT

Electronic circuits, memory devices, and methods for compensating for data distortion from channel loss are provided. In one aspect, an electronic circuit includes a converter circuit configured to convert an input signal to a digital signal and a compensation circuit coupled to the converter circuit. The converter circuit includes a sampling circuit configured to receive the digital signal and generate an output signal. The output signal includes a stream of bits to be transmitted at a plurality of consecutive clock cycles. The converter circuit also includes one or more equalizing circuits coupled to the sampling circuit. Each equalizing circuit is configured to receive a bit of an output feedback signal at one of the consecutive clock cycles. The sampling circuit is configured to generate the output signal based on the digital signal and a sum of one or more equalization outputs of the one or more equalizing circuits.

20 Claims, 12 Drawing Sheets

800

|  | Pulse Width After Compensation (ps) | | |
| --- | --- | --- | --- |
|  | Fast Corner | Typical Corner | Slow Corner |
| SWC = 0 | 205 | 210 | 230 |
| SWC = 1 | 230 | 230 | 200 |

FIG. 8

DECISION FEEDBACK EQUALIZATION IN SEMICONDUCTOR DEVICES

BACKGROUND

Integrated circuit memory devices are widely used in electronic products to store and transfer data. Recently, there have been increasing demands for memory devices with large storage capacity and high data transfer throughput.

SUMMARY

The present disclosure provides techniques relating to decision feedback equalization (DFE) in semiconductor devices.

In one aspect, the disclosure describes an electronic circuit having a converter circuit configured to convert an input signal to a digital signal and a compensation circuit coupled to the converter circuit. The compensation circuit has a sampling circuit configured to receive the digital signal and generate an output signal, the output signal including a stream of bits to be transmitted at a plurality of consecutive clock cycles. The compensation circuit has one or more equalizing circuits coupled to the sampling circuit, each of the one or more equalizing circuits being configured to receive a bit of an output feedback signal at a corresponding one of the consecutive clock cycles and generate a corresponding equalization output. The sampling circuit is configured to generate the output signal based on the digital signal and a sum of one or more equalization outputs of the one or more equalizing circuits.

In some implementations, the sum of the one or more equalization outputs includes a weighted sum.

In some implementations, the electronic circuit includes one or more capacitors coupled to the sampling circuit in parallel to the one or more equalizing circuits. The one or more capacitors can include at least one of: one or more metal-insulator-metal (MIM) capacitors, one or more metal-oxide-semiconductor capacitors (MOSCAPs), or one or more multilayer ceramic capacitors (MLCCs). The electronic circuit can further include one or more switches coupled to the one or more capacitors.

In some implementations, a pulse width of the output signal is different from a pulse width of the input signal. The electronic circuit can include a receiving circuit configured to receive a data signal from a data channel and output the input signal, wherein the pulse width of the input signal is smaller than a pulse width of the data signal. The compensation circuit can be configured such that the pulse width of the output signal is substantially identical to the pulse width of the data signal In some implementations, the electronic circuit includes a latch circuit configured to receive the output signal and output a latch output.

In some implementations, the digital signal includes a digital complementary metal-oxide-semiconductor (CMOS) signal.

In some implementations, the converter circuit includes a current mode logic (CML) circuit configured to generate a CML signal based on the input signal and a CML-to-digital converter circuit configured to convert the CML signal to the digital signal. The CML circuit can include a bias current source, a first switch controlled by the input signal, and a second switch controlled by a reference signal. The CML-to-digital converter circuit can include an analog-to-digital converter (ADC) configured to output a logic 0 or 1 based on a voltage level of the CML signal, and an amplifier circuit configured to adjust a voltage level of the logic 0 or 1 to generate the digital signal.

In some implementations, the sampling circuit includes a first N-type metal-oxide-semiconductor (NMOS) switch. The sampling circuit is configured to receive the digital signal at a gate terminal of the first NMOS switch. The one or more equalizing circuits are coupled to a drain terminal of the first NMOS switch. The one or more capacitors are coupled to the drain terminal of the first NMOS switch.

In some implementations, the sampling circuit includes a second NMOS switch. The sampling circuit is configured to receive an inverted digital signal at a gate terminal of the second NMOS switch.

In some implementations, the sampling circuit further includes a charge sharing NMOS switch. A gate terminal of the charge sharing NMOS switch is coupled to a constant voltage source. A first terminal of the charge sharing NMOS switch is coupled to the drain terminal of the first NMOS switch. A second terminal of the charge sharing NMOS switch is coupled to a drain terminal of the second NMOS switch. The first terminal is one of a drain terminal and a source terminal, and the second terminal is the other one of the drain terminal and the source terminal.

In some implementations, the sampling circuit further includes one or more reset switches. A gate terminal of each of the one or more reset switches is driven by a clock signal. A drain terminal of each of the one or more reset switches is coupled to the first NMOS switch. A source terminal of each of the one or more reset switches is coupled to a constant voltage source or a ground.

In some implementations, each of the one or more equalizing circuits includes: a first feedback switch configured to receive the bit of the output feedback signal; a second feedback switch configured to receive a logic opposite of the bit of the output feedback signal; and one or more weighting control switches configured to receive a weighting control signal.

In some implementations, the one or more weighting control switches are configured to connect the first feedback switch and the second feedback switch to a plurality of weighting switches based on the weighting control signal.

In some implementations, the one or more weighting control switches are configured to connect the first feedback switch and the second feedback switch to one or more current mirror circuits based on the weighting control signal.

In some implementations, the compensation circuit is a first compensation circuit, and the sampling circuit is a first sampling circuit. The electronic circuit includes a second compensation circuit, and the second compensation circuit includes a second sampling circuit configured to receive the digital signal and generate the output feedback signal at the plurality of consecutive clock cycles.

In some implementations, the electronic circuit includes: a first latch circuit coupled to the first compensation circuit; and a second latch circuit coupled to the second compensation circuit. The first latch circuit is configured to output a first latch output. The second latch circuit is configured to output a second latch output.

In some implementations, the electronic circuit further includes a third compensation circuit and a fourth compensation circuit. The first compensation circuit is driven by a first clock signal. The second compensation circuit is driven by a second clock signal. The third compensation circuit is driven by a third clock signal, and the fourth compensation circuit is driven by a fourth clock signal. The first clock signal, the second clock signal, the third clock signal, and the fourth clock signal have a same cycle length. The first clock signal is ahead of the second clock signal by a quarter of the cycle length. The second clock signal is ahead of the third clock signal by a quarter of the cycle length. The third clock signal is ahead of the fourth clock signal by a quarter of the cycle length.

In another aspect, the disclosure provides a memory device having: a memory interface circuit coupled to a data channel; a memory cell array; a data buffer circuit; and a control logic circuit coupled to the memory interface circuit, the memory cell array, and the data buffer circuit. The data buffer circuit has a converter circuit configured to receive an input signal from the memory interface circuit and convert the input signal to a digital signal and a compensation circuit coupled to the converter. The compensation circuit has a sampling circuit configured to receive the digital signal and generate an output signal, the output signal including a stream of bits to be transmitted at a plurality of consecutive clock cycles. The compensation circuit also has one or more equalizing circuits coupled to the sampling circuit, each of the one or more equalizing circuits being configured to receive a bit of an output feedback signal at a corresponding one of the consecutive clock cycles and generate a corresponding equalization output. The sampling circuit is configured to generate the output signal based on the digital signal and a sum of one or more equalization outputs of the one or more equalizing circuits.

In some implementations, the data buffer circuit includes a plurality of compensation circuits including the compensation circuit, each of the plurality of compensation circuits including a respective sampling circuit and at least one respective equalizing circuit configured to receive an output feedback signal from an output of a different compensation circuit among the plurality of compensation circuits.

In some implementations, the data buffer circuit further includes a plurality of latch circuits, each latch circuit being coupled to a respective compensation circuit of the plurality of compensation circuits and configured to receive an output signal from the respective compensation circuit and output a latch output signal.

In another aspect, the disclosure provides a method for compensating for data distortion from channel loss. The method includes: receiving an input signal from a data channel; converting the input signal to a digital signal; generating a sampling output signal, the sampling output signal including a stream of bits to be transmitted at a plurality of consecutive clock cycles; and providing, to each of one or more equalizing circuits, a bit of an output feedback signal at a corresponding one of the consecutive clock cycles. The sampling output signal is generated based on the digital signal and a sum of one or more equalization outputs of the one or more equalizing circuits.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIG. 8 illustrates a table showing example compensation effect of pulse width reduction.

Figures are not drawn to scale. Like reference numbers refer to like components.

DETAILED DESCRIPTION

Figure 1:
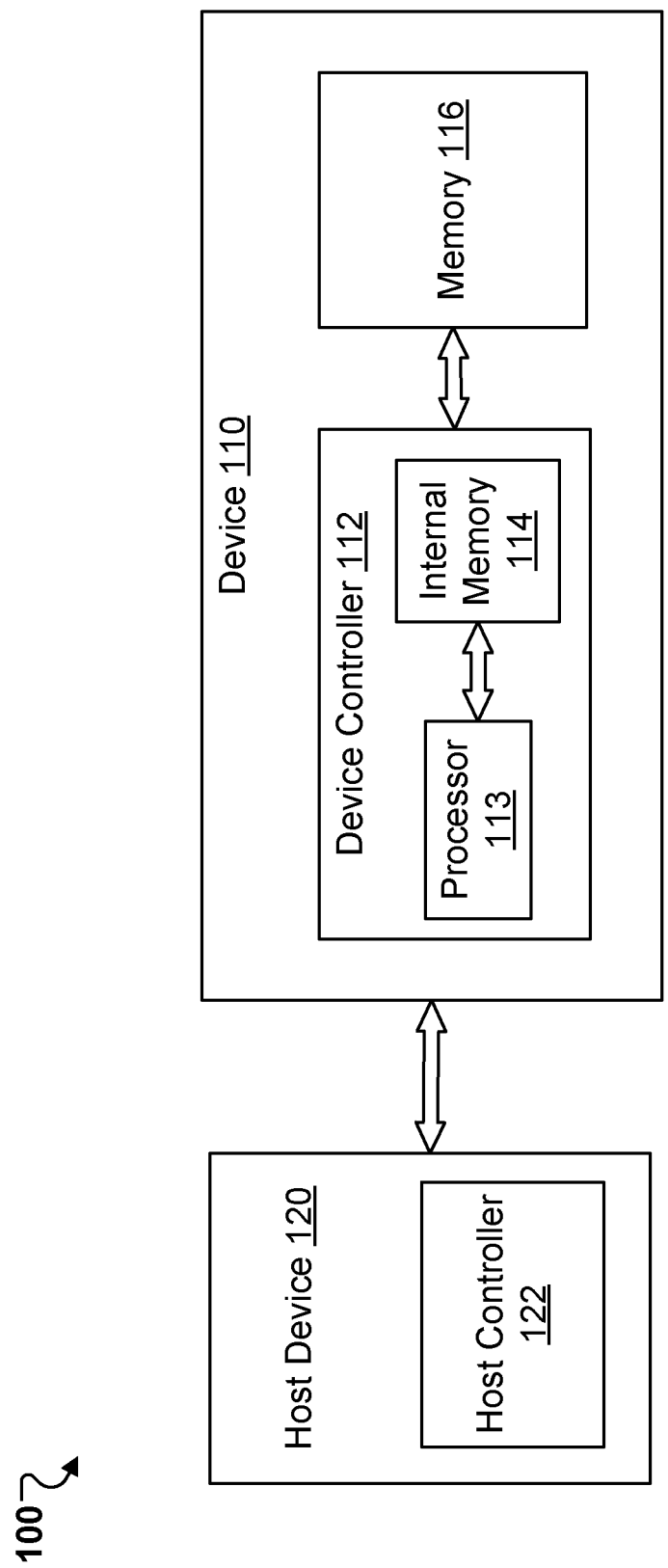
FIG. 1 illustrates a block diagram of an example system including a memory device, according to one or more implementations.

A semiconductor device (e.g., a memory device) can receive data from a host device, such as a personal computer. The data transmission is often prone to noise and interference that cause distortion of the data waveform sampled by the semiconductor device. One type of interference is ISI. With ISI, a first data symbol (e.g., a bit) having a voltage level (e.g., logic 0) sampled at an earlier clock cycle can cause a second data symbol having a different voltage level (e.g., logic 1) sampled at a later clock cycle to have a reduced pulse width. The reduction in pulse width of the second data symbol can increase the probability of data error rate.

To mitigate the effect of ISI, in some cases, semiconductor devices implement an equalization circuit, such as a DFE circuit, that feeds back one or more earlier symbols of the output signal to a receiver circuit. As such, the later symbol of the output signal can take into account the earlier symbols and compensate for the reduction of pulse width. In some cases, DFE circuits feed back the earlier symbols to a CML circuit, which compensates the pulse width reduction of input signal and generates a pair of differential analog signals. The sampling circuits then convert the analog signals to digital signals, which can feed back for the next input signal compensation. The feedback path in these DFE circuits thereby incur considerable delay from the CML circuit to the sampling circuit. Because the feedback requires the compensation and sampling be completed within one clock cycle, it becomes difficult to satisfy the timing requirement using the DFE circuits in memory devices that support high speed data transmission.

Implementations of the present disclosure provide techniques for addressing the above challenges. In some implementations, a DFE architecture is configured to improve DFE performance with small feedback delay and compensation space tuning. This architecture can also mitigate long tail post-cursor ISI thereby reducing the bit error rate. As described in detail below, the techniques can reduce the feedback delay in a DFE circuit. For example, some implementations of the techniques can feed back the output signal directly to the sampling circuit, without going through the CML circuit, which can reduce the feedback delay and make the implemented DFE circuits suitable for high-speed memory devices. Moreover, the techniques can support adjustable pulse width compensation space. With one or more features described below, implementations of this disclosure improve the quality of data reception and flexibility of DFE.

The techniques can be applied to any suitable circuits or devices such as semiconductor devices. For illustration purposes, a memory device is described herein as an example of a semiconductor device. For example, the techniques can be applied to various types of non-volatile memory devices such as NOR flash memory devices, NAND flash memory devices, erasable programmable read-only memory (EPROM), Static Random Access Memory (SRAM), Resistive random-access memory (RRAM), Ferroelectric Random Access Memory (FeRAM), Magnetoresistive random-access memory (MRAM), among others. The techniques can be applied to various memory types, such as SLC (single-level cell) devices, MLC (multi-level cell) devices like 2-level cell devices, TLC (triple-level cell) devices, QLC (quad-level cell) devices, or PLC (penta-level cell) devices. Additionally or alternatively, the techniques can be applied to various types of devices and systems, such as secure digital (SD) cards, embedded multimedia cards (eMMC), solid-state drives (SSDs), embedded systems, or computing network devices, among others.

FIG. 1 illustrates an example system 100 including a memory device, according to one or more implementations. The system 100 includes a device 110 and a host device 120. The device 110 includes a device controller 112 and a memory 116. The device controller 112 includes a processor 113 and an internal memory 114. In some implementations, the device 110 includes a plurality of memories 116 that are coupled to the device controller 112.

In some implementations, the device 110 is a storage device. For example, the device 110 can be an embedded multimedia card (eMMC), a secure digital (SD) card, a solid-state drive (SSD), or some other suitable storage. In some implementations, the device 110 is a smart watch, a digital camera or a media player. In some implementations, the device 110 is a client device that is coupled to a host device 120. For example, the device 110 is an SD card in a digital camera or a media player that is the host device 120.

The device controller 112 is a general-purpose microprocessor, or an application-specific microcontroller. In some implementations, the device controller 112 is a memory controller for the device 110. The following sections describe the various techniques based on implementations in which the device controller 112 is a memory controller. However, the techniques described in the following sections are also applicable in implementations in which the device controller 112 is another type of controller that is different from a memory controller.

The processor 113 is configured to execute instructions and process data. The instructions include firmware instructions and/or other program instructions that are stored as firmware code and/or other program code, respectively, in the secondary memory. The data includes program data corresponding to the firmware and/or other programs executed by the processor, among other suitable data. In some implementations, the processor 113 is a general-purpose microprocessor, or an application-specific microcontroller. The processor 113 is also referred to as a central processing unit (CPU).

The processor 113 accesses instructions and data from the internal memory 114. In some implementations, the internal memory 114 is a Static Random Access Memory (SRAM) or a Dynamic Random Access Memory (DRAM). For example, in some implementations, when the device 110 is an eMMC, an SD card or a smart watch, the internal memory 114 is an SRAM. In some implementations, when the device 110 is a digital camera or a media player, the internal memory 114 is DRAM.

In some implementations, the internal memory is a cache memory that is included in the device controller 112, as shown in FIG. 1A. The internal memory 114 stores instruction codes, which correspond to the instructions executed by the processor 113, and/or the data that are requested by the processor 113 during runtime.

The device controller 112 transfers the instruction code and/or the data from the memory 116 to the internal memory 114. The memory 116 can be a semiconductor device. In some implementations, the memory 116 is a non-volatile memory that is configured for long-term storage of instructions and/or data, e.g., a NAND flash memory device, or some other suitable non-volatile memory device. In implementations where the memory 116 is NAND flash memory, the device 110 is a flash memory device, e.g., a flash memory card, and the device controller 112 is a NAND flash controller. For example, in some implementations, when the device 110 is an eMMC or an SD card, the memory 116 is a NAND flash; in some implementations, when the device 110 is a digital camera, the memory 116 is an SD card; and in some implementations, when the device 110 is a media player, the memory 116 is a hard disk.

The memory 116 includes a plurality of blocks. The memory 116 can be a two-dimensional (2D) memory including 2D memory blocks. The memory 116 can also be a three-dimensional (3D) memory including 3D memory blocks.

Figure 2:
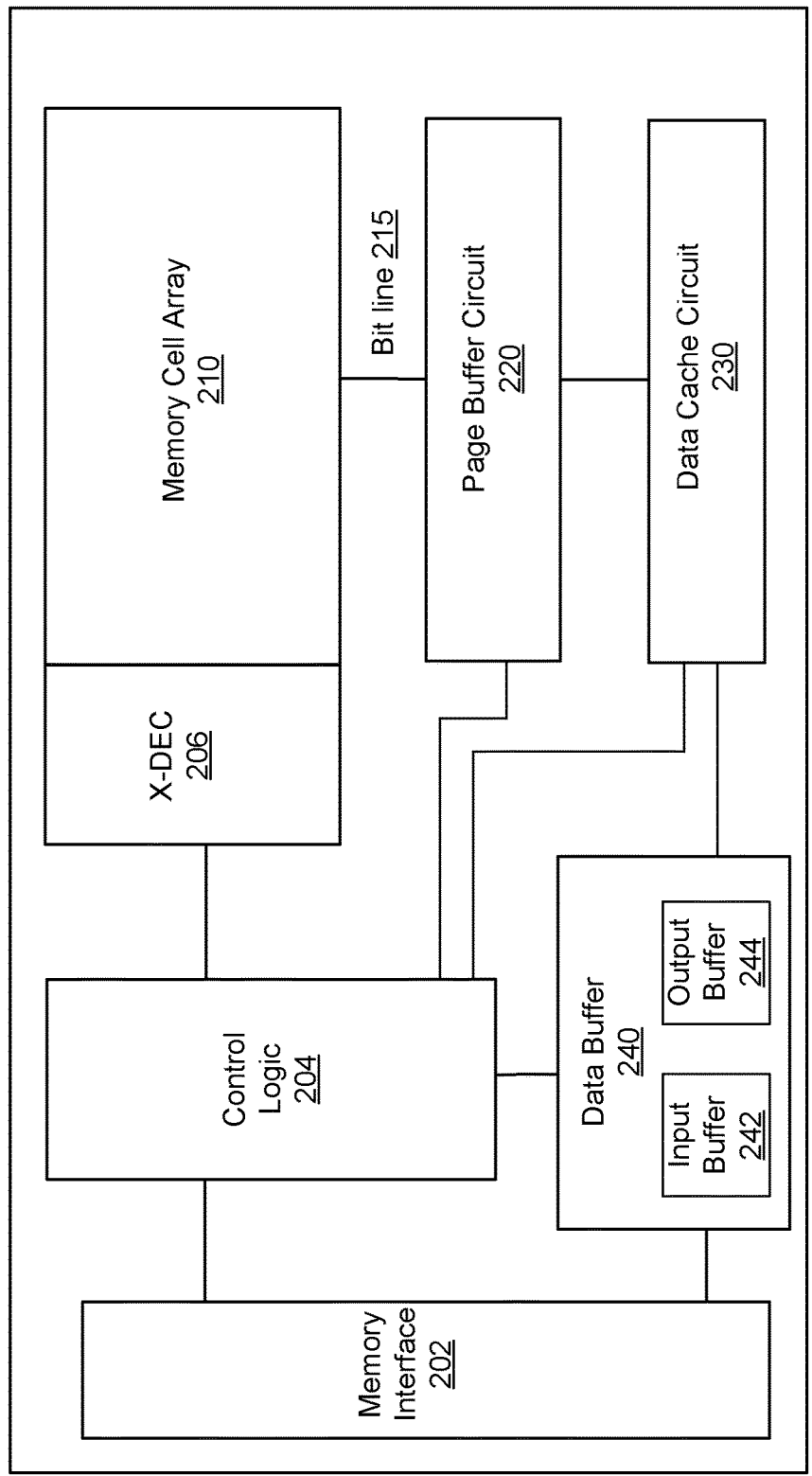
FIG. 2 illustrates a block diagram of an example memory device, according to one or more implementations.

FIG. 2 illustrates an example memory device 200, according to one or more implementations. The memory device 200 can be implemented as the memory 116 of FIG. 1. The memory device 200 includes a memory cell array 210. The memory cell array 210 can include a number of memory cells coupled in series to a number of row word lines and a number of column bit lines.

A memory cell can include a memory transistor configured as a storage element. The memory transistor can include a silicon-oxide-nitride-oxide-silicon (SONOS) transistor, a floating gate transistor, a nitride read only memory (NROM) transistor, or any suitable non-volatile memory metal-oxide-silicon (MOS) device that can store charges.

The memory device 200 includes a memory interface 202 having multiple input/output (I/O) ports for receiving data, e.g., from a controller such as the device controller 112 of FIG. 1 or the host controller 122 of FIG. 1, or outputting data from the memory cell array 210. The memory device 200 includes a data buffer 240 configured to buffer data through the memory interface 202. The data buffer 240 can include a data input buffer 242 configured to buffer/transmit data from a controller (e.g., the device controller 112 of FIG. 1 or the host controller 122 of FIG. 1) through the memory interface 202 to the memory cell array 210. The data buffer 240 can also include a data output buffer 244 configured to buffer/transmit out data from the memory cell array 210 through the memory interface 202, e.g., to a host device such as the host device 120 of FIG. 1.

In some implementations, the memory device 200 further includes an X-decoder (or row decoder) 206 and an optional Y-decoder (not shown). Each memory cell is coupled to the X-decoder 206 via a respective word line and coupled to the Y-decoder via a respective bit line 215. Accordingly, each memory cell can be selected by the X-decoder 206 and the Y-decoder for read or write operations through the respective word line and the respective bit line 215.

The memory device 200 includes a page buffer circuit 220 that includes a number of page buffers. Each page buffer is connected to the memory cell array 210 through a respective bit line 215. In some implementations, a page buffer is connected to the Y-decoder through a data line associated with a corresponding bit line 215 that connects a corresponding line of memory cells in the memory cell array 210. A page buffer is configured to control a voltage on a corresponding bit line to perform an operation, e.g., read, program, or erase, on a memory cell coupled to the corresponding bit line. A page buffer can include at least one latch circuit.

In some implementations, the memory device 200 further includes a data cache circuit 230 coupled between the page buffer circuit 220 and the data buffer 240. During a program or erase operation, the data cache circuit 230 is configured to store data from the data buffer 240 (e.g., from the data input buffer 242) and/or output through the page buffer circuit 220 to the memory cell array 210. During a read operation, the data cache circuit 230 is configured to store data from the memory cell array through the page buffer circuit 220 and/or output data to the data buffer 240 (e.g., to the data output buffer 244).

In some implementations, the memory device 200 further includes a control logic 204 coupled to components in the memory device 200 including the X-decoder 206 and the Y-decoder, the data buffer 240, the page buffer circuit 220, and the data cache circuit 230. The control logic 204 is configured to receive a command, address information, and/or data, e.g., from a memory controller such as the device controller 112 or the host controller 122 of FIG. 1, via the memory interface 202. The control logic 204 can also process the command, the address information, and/or the data, for example, to generate physical address information, e.g., of blocks/pages, in the memory cell array 210. The control logic 204 can include circuitry, e.g., an integrated circuit integrating multiple logics, circuits, and/or components.

In some implementations, the control logic 204 includes a data register, an SRAM buffer, an address generator, a mode logic, and a state machine. The mode logic can be configured to determine whether there is a read or write operation and provide a result of the determination to the state machine.

During a write operation, the data register in the control logic 204 can register input data from the memory interface 202, and the address generator in the control logic 204 can generate corresponding physical addresses to store the input data in specified memory cells of the memory cell array 210. The address generator can be connected the X-decoder 206 and the Y-decoder that are controlled to select the specified memory cells through corresponding word lines and bit lines. The SRAM buffer can retain the input data from the data register in its memory as long as power is being supplied. The state machine can process a write signal from the SRAM buffer and provide a control signal to a voltage generator that can provide a write voltage to the X-decoder 206 and/or the Y-decoder. The Y-decoder is configured to output the write voltage to the bit lines (BLs) for storing the input data in the specified memory cells.

During a read operation, the state machine can provide control signals to the voltage generator and the page buffer circuit 220. The voltage generator can provide a read voltage to the X-decoder 206 and the Y-decoder for selecting a memory cell. A page buffer can sense a small power signal (e.g., a current signal) that represents a data bit ("1" or "0") stored in the selected memory cell through a bit line 215 coupled to the page buffer and the selected memory cell. A sense amplifier can amplify the small power signal swing to recognizable logic levels so the data bit can be interpreted properly by logic inside or outside the memory device 200. In some implementations, the page buffer circuit 220 and/or the data cache circuit 230 are included in the sense amplifier. The data buffer 240 (e.g., the data output buffer 244) can receive the amplified voltage from the sensor amplifier and output the amplified power signal to the logic outside the memory device 200 through the memory interface 202.

Figure 3A:
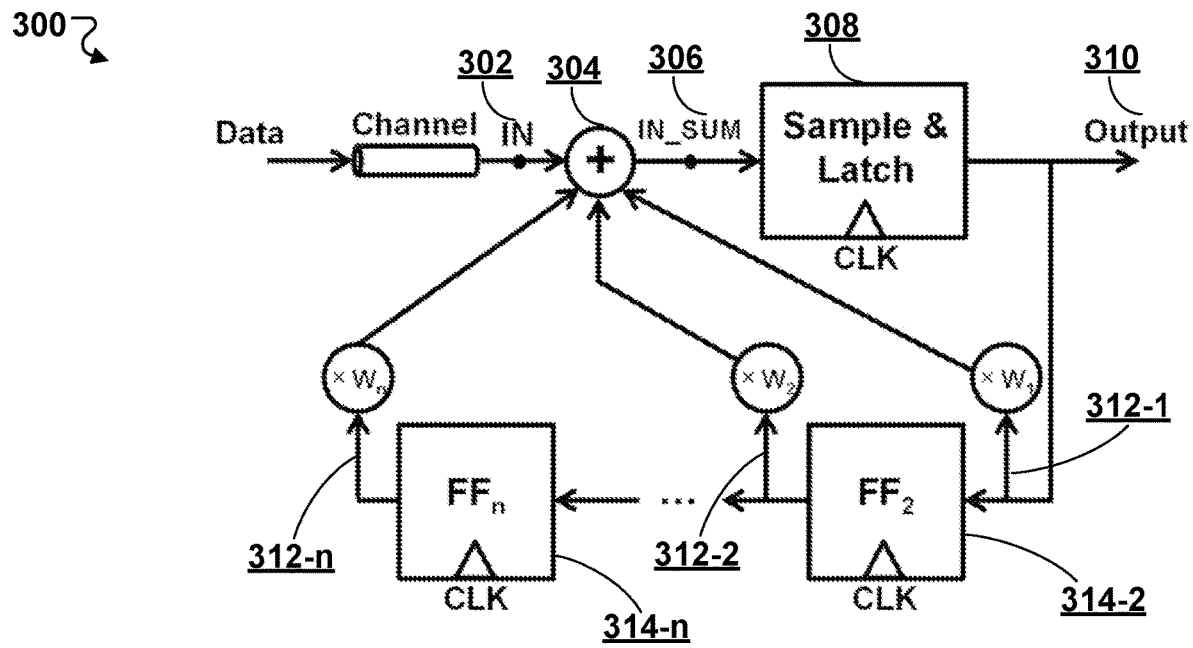
FIG. 3A illustrates an example architecture of a receiver with DFE, according to one or more implementations.

FIG. 3A illustrates an example architecture 300 of a receiver with DFE, according to one or more implementations. The architecture 300 can be implemented in the input buffer 242 of FIG. 2 to mitigate ISI.

In some implementations, the architecture 300 includes an input node that receives data from a channel. The channel can be, e.g., a wired cable or bus, or a wireless communication channel. The received data is input to an adder 304, which outputs a sum 306.

In some implementations, the architecture 300 also includes a Sample & Latch circuit 308 driven by a clock (CLK) signal. At each cycle of the clock signal, the Sample & Latch circuit 308 can sample one bit of the sum 306 and latch (e.g., store for an extended period of time) the output to obtain a sample output 310 for further processing.

In some implementations, the architecture 300 further includes n feedback loops from the sample output 310 to the adder 304, where n is an integer greater than or equal to 1. Each feedback loop is referred to as a tap. In a given clock cycle, one bit of the sample output 310 is weighted by a weight and fed back to the adder 304 via each feedback loop. For example, in a first feedback loop, a latest bit 312-1 of the sample output 310 is weighted by $W_1$ and fed back to the adder 304. At the same clock cycle, in a second feedback loop, a second latest bit 312-2, output by the Sample & Latch circuit 308 in the previous clock cycle and delayed by one flip-flop (FF) 314-2, is weighted by $W_2$ and fed back to the adder 304. Likewise, at the same clock cycle, in the n-th feedback loop, the n-th latest bit 312-$n$, output by the Sample & Latch circuit 308 (n−1) clock cycles ago and delayed by (n−1) flip-flops 314-2 to 314-$n$. is weighted by $W_n$ and fed back to the adder 304. By way of these feedback loops, the sampling at the Sample & Latch circuit 308 can take into account the impact of the earlier bits on the data and accordingly compensate for the pulse width change caused by ISI. Because ISI usually decreases as the time gap between symbols increases, $W_1$ can have the greatest value among all weights in the n feedback loops.

Figure 3B:
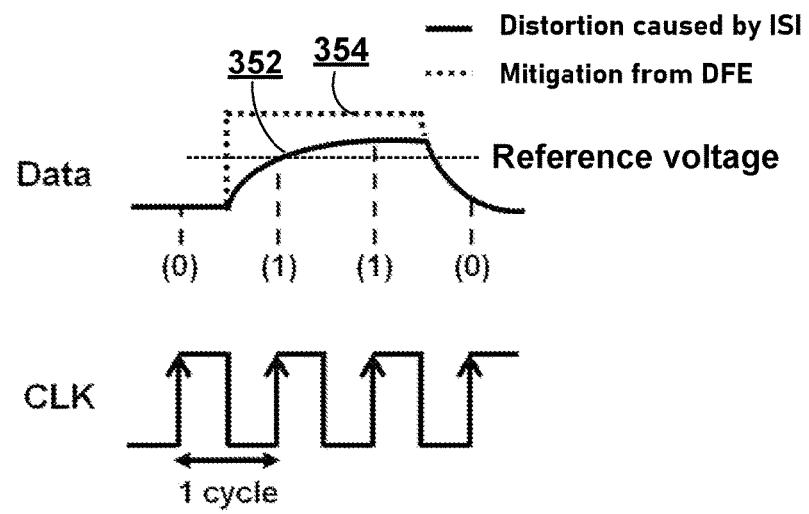
FIG. 3B illustrates a reduction of pulse width caused by inter-symbol interference (ISI) and a compensation for pulse width reduction, according to one or more implementations.

FIG. 3B illustrates a waveform distortion caused by ISI and a mitigation effect from DFE to the distorted waveform. In FIG. 3B, a curve 352 shows the waveform distortion caused by ISI, while a curve 354 shows the mitigation effect from DFE. The waveforms cover four consecutive bits of data, with logic values of 0, 1, 1, and 0, respectively.

As shown on the curve 352, in the first clock cycle, the data is at a low voltage level corresponding to logic 0 without distortion. In the second clock cycle, because the logic value of the second bit is 1, the voltage of the data ideally should have risen to a high level corresponding to logic 1 immediately at the beginning of the second clock cycle. However, due to ISI from the first bit, the voltage of the data at the second bit fails to promptly and fully rise to the level of logic 1. Instead, throughout the second clock cycle, the data voltage gradually ramps up and never reaches the high level corresponding to logic 1, thereby manifesting a distorted shape on the curve 352. Likewise, in the third clock cycle, ISI from the first bit continues to cause distortion on the third bit, though to a less extent than the distortion on the second bit. Throughout the third clock cycle, the data voltage continues to ramp up towards the level corresponding to logic 1 but never reaches that level. Similar to the distortions on the second and the third bits, when the data changes to logic 0 at the fourth bit, ISI slows down the voltage drop in the fourth clock cycle.

The distortions in the second to the fourth clock cycles can lead to reduced pulse width. For example, a typical one-bit sampling circuit compares the data voltage with a reference voltage and outputs a sample of "1" if the data voltage is higher than the reference voltage. As shown on the curve 352, because of the gradual voltage ramp-up in the first clock cycle, the data voltage is higher than the reference voltage only during a portion of the first clock cycle. As a result, the sampling circuit will output "1" during the portion of the clock cycle while inaccurately outputting "0" during the rest of the clock cycle. This effectively reduces the pulse width of the first bit of data.

DFE is a means to mitigate the distortion caused by ISI. As described with reference to FIG. 3A and manifested on the curve 354, a DFE circuit can take into account the values of earlier bits that contribute to ISI. The DFE circuit can also provide a mechanism to compensate for the reduced pulse width caused by ISI. Detailed implementations of DFE circuits are described below.

Figure 4:
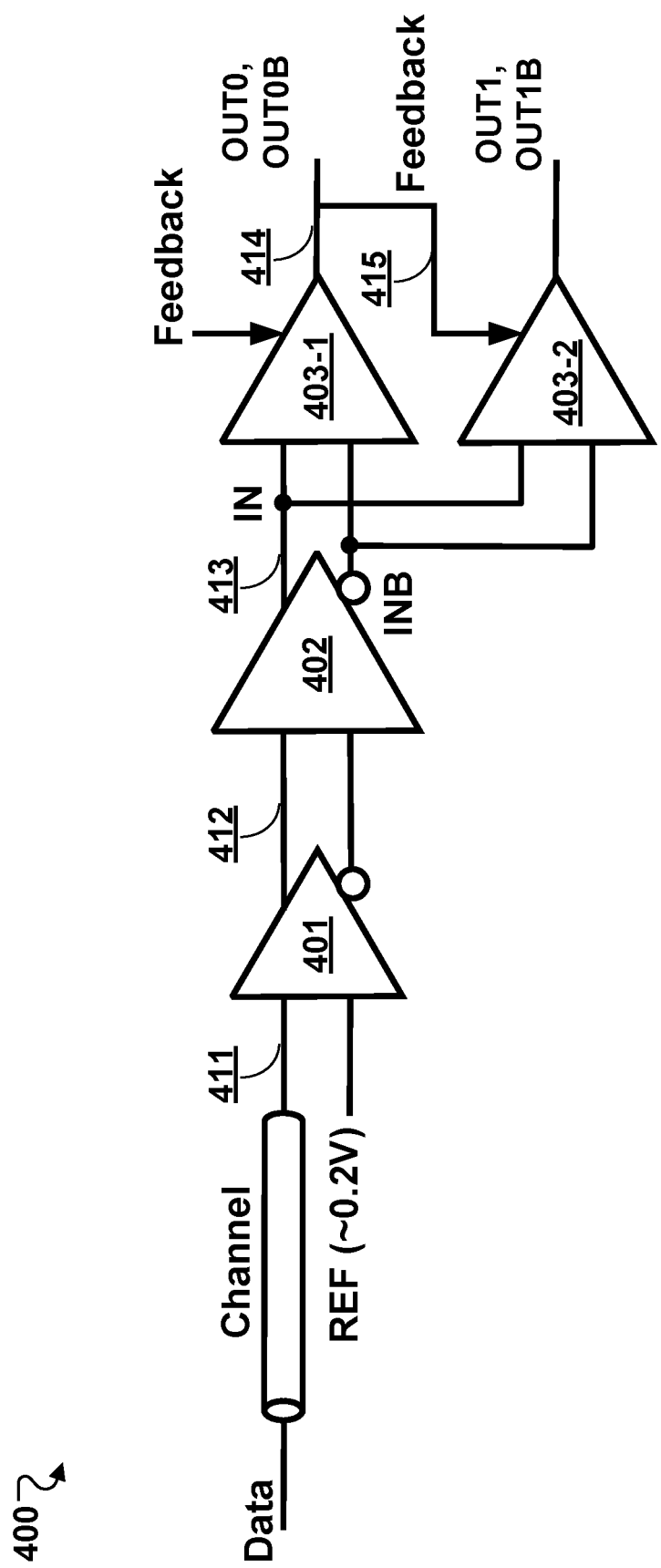
FIG. 4 illustrates an example receiver with DFE, according to one or more implementations.

FIG. 4 illustrates an example receiver 400 with DFE, according to one or more implementations. The feedback equalization circuit 400 can have an architecture similar to the architecture 300 of FIG. 3A and can be implemented in the input buffer 242 of FIG. 2.

In some implementations, the receiver 400 with DFE includes a CML circuit 401. The CML circuit 401 receives an input signal 411 from a data channel and receives a reference signal REF. The reference signal REF can have a constant voltage level. In some implementations, the constant voltage level is set at about a middle point of a high voltage level corresponding to logic 1 of the input data signal and a low voltage level corresponding to logic 0 of the input signal. For example, when the input signal uses 0.4 V to represent logic 1 and uses 0 V to represent logic 1, the reference signal REF can have a constant voltage of about 0.2 V. In some implementations, the constant voltage of the reference signal REF can be configured with other values different from the middle point of the voltage levels of logic 1 and logic 0.

Based on the input signal 411 and the reference signal REF, the CML circuit 401 outputs a CML signal 412. The CML signal 412 can be output in a differential mode on two paths with opposite voltage levels. For example, when a first path has a high voltage level, the other path has the low voltage level, and vice versa.

In some implementations, the receiver 400 with DFE includes a CML-to-digital converter circuit 402. The CML-to-digital converter circuit 402 receives the CML signal 412 and converts the CML signal 412 to a digital signal 413. For example, the CML-to-digital converter circuit 402 can include an analog-to-digital converter (ADC) that outputs a digital 0 or 1 based on the voltage level of CML signal 412.

In addition, the CML-to-digital converter circuit 402 can include an amplifier circuit to adjust the voltage levels representing the digital 0 or 1. For example, when the input signal 411 uses 0 V and 0.4 V to represent logic 0 and 1, respectively, the CML-to-digital converter circuit 402 can be configured to output the digital signal 413 using 0 V and 1.2 V to represent logic 0 and 1, respectively. With the increased magnitude difference between logic 0 and 1, the digital signal 413 can be suitable for CMOS circuits, which can have faster operation. In such situations, the digital signal 413 can be a CMOS signal.

The CML-to-digital converter circuit 402 can receive the CML signal 412 via a single input port. Alternatively, when the CML circuit 401 provides the CML signal 412 in the differential mode, the CML-to-digital converter circuit 402 can receive both paths from the CML signal 412 via two differential input ports, e.g., as illustrated in FIG. 4. The CML-to-digital converter circuit 402 can output the digital signal 413 via a single output port. Alternatively, the CML-to-digital converter circuit 402 can output the digital signal 413 in the differential mode via two output ports, e.g., as illustrated in FIG. 4. The CML circuit 401 and the CML-to-digital converter circuit 402 together form a converter circuit that converts the input signal 411 to the digital signal 413.

In some implementations, the receiver 400 with DFE also includes one or more strong arm latch comparator with compensation circuits 403-1, 403-2, etc., collectively referred to as strong arm latch comparator with compensation circuits 403 and individually referred to as strong arm latch comparator with compensation circuit 403. The strong arm latch comparator with compensation circuits 403 receive the digital signal 413 from the CML-to-digital converter circuit 402 either as a single-port input or as differential inputs denoted as IN and INB (e.g., as illustrated in FIG. 4). Each strong arm latch comparator with compensation circuit 403 generates an output signal 414. Each strong arm latch comparator with compensation circuit 403 also receives a corresponding output signal 414 as a feedback signal 415 from a corresponding output port, e.g., OUT0/OUT0B or OUT1/OUT1B. Each compensation circuit 403 either receives its own output signal 414 as the output feedback signal 415 from its own output port or receives another output signal 414 as the output feedback signal 415 from another output port of another compensation circuit 403. The strong arm latch comparator with compensation circuits 403 can function similarly to a combination of the adder 304, the Sample & Latch circuit 308, and the feedback loops in the architecture 300.

Figure 5:
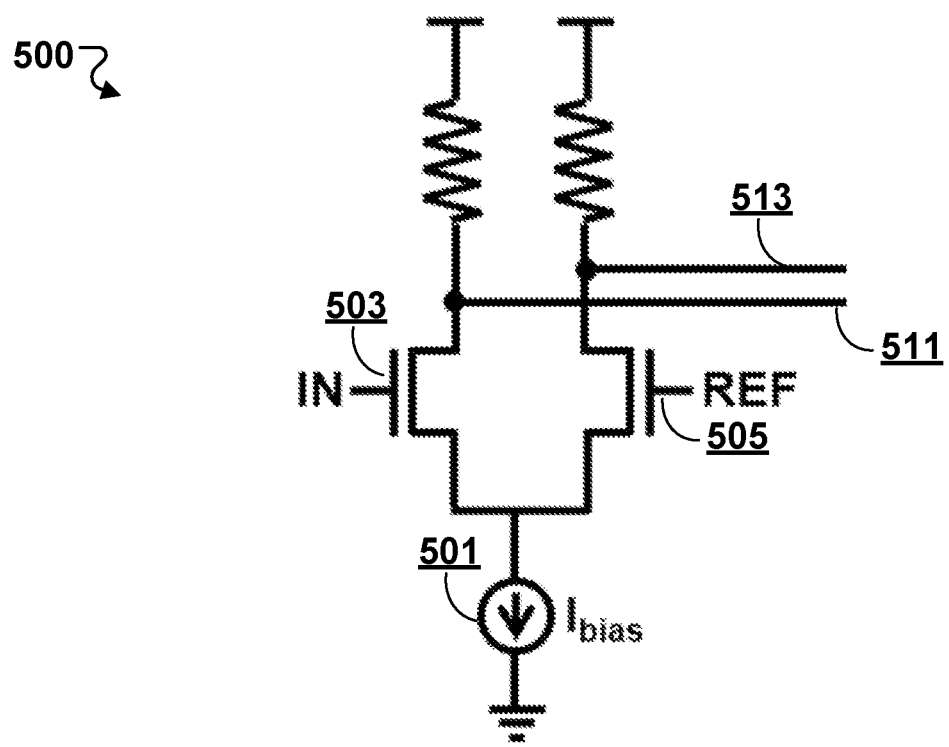
FIG. 5 illustrates an example CML circuit, according to one or more implementations.

FIG. 5 illustrates an example CML circuit 500, according to one or more implementations. The CML circuit 500 can be implemented as the CML circuit 401 of FIG. 4.

In some implementations, the CML circuit 500 includes a bias current source 501, a first switch 503 controlled by an input signal IN, and a second switch 505 controlled by a reference signal REF. Each of the first switch 503 and the second switch 505 can be a transistor, e.g., an MOS transistor. The first and second switches 503 and 505 are connected in parallel, providing two alternative paths 511 and 513 for a current $I_{bias}$ to flow from the bias current source 501. When the input signal IN has a voltage greater than the reference signal REF, the current $I_{bias}$ flows through the first switch 503 to the path 511. When the input signal IN has a voltage lower than the reference signal REF, the current $I_{bias}$ flows through the second switch 505 to the path 513. The CML circuit 500 thus outputs an CML signal in the differential mode via the two paths 511 and 513.

Figure 6:
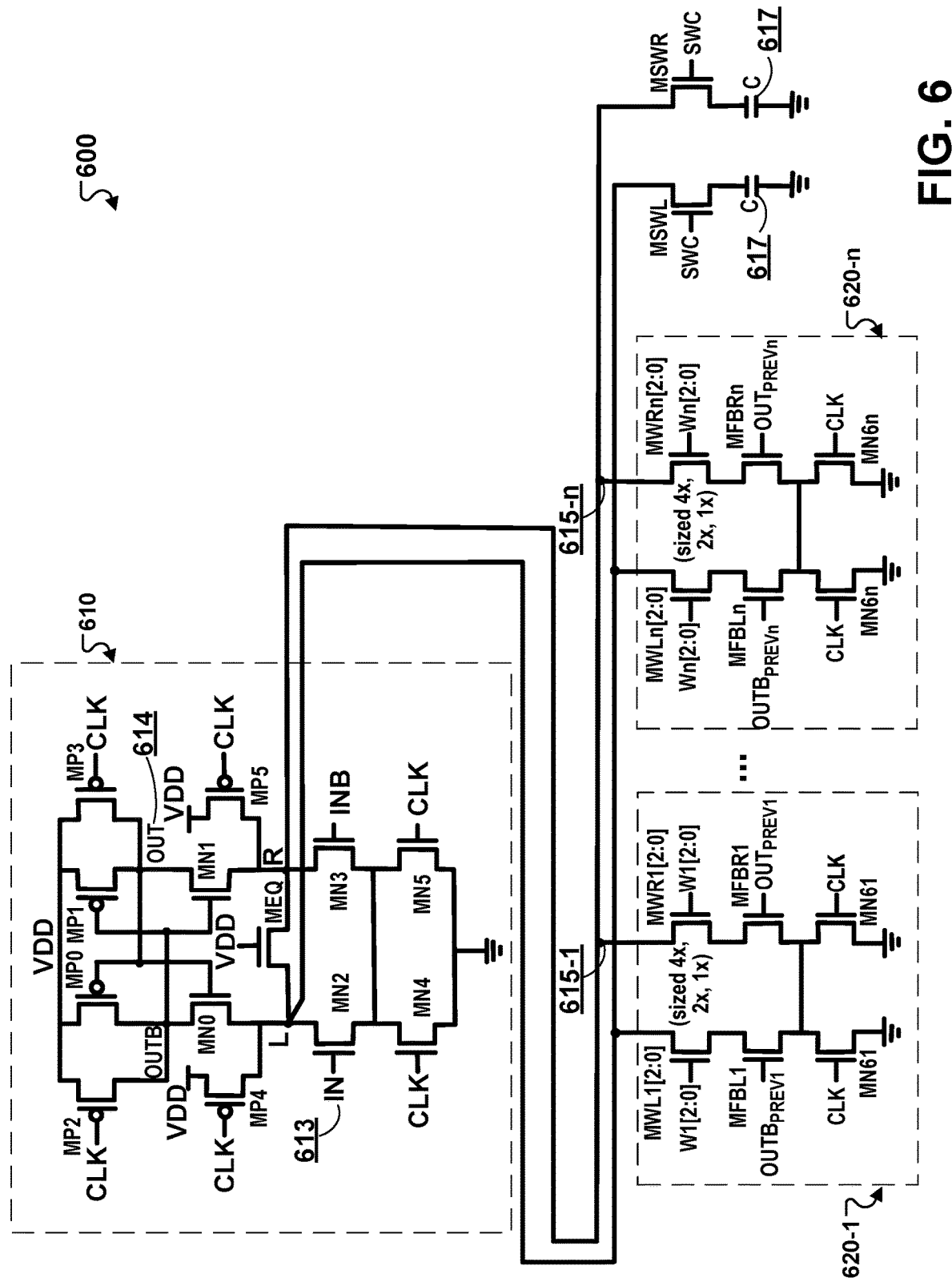
FIG. 6 illustrates an example Strong Arm latch comparator with compensation circuit, according to one or more implementations.

FIG. 6 illustrates an example strong arm latch comparator with compensation circuit 600, according to one or more implementations. The strong arm latch comparator with compensation circuit 600 can be implementation as a single circuit 403 or a combination of one or more circuits 403 in FIG. 4.

In some implementations, the strong arm latch comparator with compensation circuit 600 includes a sampling circuit 610, which can function similarly to the sampling performed by the Sample & Latch circuit 308 of the architecture 300. The strong arm latch comparator with compensation circuit 600 can also include n equalizing circuits 620-1 to 620-n (collectively referred to as equalizing circuits 620 or individually referred to as equalizing circuit 620) connected in parallel to each other. The n equalizing circuits 620-1 to 620-n can function similarly to the n feedback loops of the architecture 300.

The sampling circuit 610 receives a digital signal 613. The digital signal 613 can be a single-port input, denoted as IN, or can include a pair of differential digital signals, denoted as IN and INB. The digital signal 613 can be the digital signal 413 of FIG. 4. The sampling circuit 610 also outputs an output signal 614, which can be the output signal 414 of FIG. 4. The output signal 614 can be a single-port output, denoted as OUT, or can include a pair of differential output signals, denoted as OUT and OUTB. The below description assumes the digital signal 613 and the output signal 614 both include a pair of differential signals. Under this assumption, the one or more equalizing circuits 620, which provide weighted output feedback signals to the sampling circuit 610, can be also formed in the differential mode.

The sampling of the digital signal 613 can be synchronized with a clock signal CLK, which is connected to the gate terminals of NMOS switches MN4 and MN5. At each rising edge of the clock signal CLK, the pair of differential digital signals IN and INB, which are connected to the gate terminals of NMOS switches MN2 and MN3, cause the NMOS switches MN2 and MN3 to turn on or off, thereby controlling the current paths from IN and INB to OUTB and OUT, respectively. As such, the voltage values of IN and INB are sampled at OUT and OUTB, respectively.

To provide a leakage path for nodes L and R in order to avoid output data flip, the sampling circuit 610 has a charge sharing NMOS switch MEQ connected between the drain terminals of NMOS switches MN2 and MN3. The gate terminal of the charge sharing NMOS switch MEQ is connected to VDD, which denotes a high voltage level. The sampling circuit 610 can also include one or more PMOS reset switches MP4 and MP5, driven by the falling edge of the clock signal CLK. When the clock signal CLK is low, the sampling stops and the PMOS reset switches MP4 and MP5 are turned on, allowing the high voltage VDD to reach nodes L and R. This can ensure that, at the beginning of each clock cycle, the voltages at nodes L and R are both reset to VDD.

Each equalizing circuit 620 can form a feedback loop. Taking the equalizing circuit 620-1 as an example, under the differential mode, the equalizing circuit 620-1 receives as input a previous bit of each of OUT and OUTB, denoted as $OUT_{PREV1}$ and $OUTB_{PREV1}$, respectively. By controlling the NMOS switches MFBL1, MFBR1, MWL1[2:0], and MWR1[2:0], the equalizing circuit 620-1 generates an output feedback signal 615-1, which can include a pair of differential feedback signals. The reception of $OUT_{PREV1}$ and $OUTB_{PREV1}$ and the generation of the output feedback signal 615-1 are synchronized with the clock signal CLK. The output feedback signals 615-1 to 615-n from the n equalizing circuits 620 add up at nodes L and R of the sampling circuit 610. The add-up of the output feedback signals 615-1 to 615-n at nodes L and R can be similar to the function of the adder 304 of the architecture 300 of FIG. 3A.

Consistent with the architecture 300, the equalizing circuits 620 can weigh their respective output feedback signals 615-1 to 615-n before outputting. The weighting can be realized by one or more weighting switches. Using the equalizing circuit 620-1 as an example, at each clock cycle, $OUT_{PREV1}$ and $OUTB_{PREV1}$ control the NMOS switches MFBR1 and MFBL1 to turn on or off, thereby controlling the current flows through MFBR1 and MFBL1. Meanwhile, depending on the value of a weighting control signal W[2:0], the current flows pass through one or more weighting switches MWL1[2:0] and MWR1[2:0]. MWL1[2:0] and MWR1[2:0] each can include three NMOS switches of different sizes (e.g., 1x, 2x, and 4x), and can output current flows of different magnitudes. As such, by adjusting the weighting control signal W[2:0], a user of the equalizing circuit 620-1 can tune the weight imposed on the output feedback signal 615-1. This weighting mechanism can be similar to the weighting using $W_1, W_2, \ldots W_n$ in the architecture 300 of FIG. 3A.

In some alternative implementations, the equalizing circuits 620 can use current mirror circuits to replace the weighting switches MWL1[2:0] and MWR1[2:0] for weighing the output feedback signals 615-1 to 615-n based on the weighting control signal W[2:0], e.g., to tune feedback gain. The structure and operation of current mirror circuits can be readily understood by one of ordinary skill in the art and are not described in this disclosure in detail.

In some implementations, the strong arm latch comparator with compensation circuit 600 also includes one or more capacitors 617, which can increase typical and fast corner hold time and provide compensation space for channel loss. The one or more capacitors 617 can be coupled to the sampling circuit 610 at nodes L and R in parallel to the equalizing circuits 620. The one or more capacitors 617 can be metal-insulator-metal (MIM) capacitors, multilayer ceramic capacitors (MLCCs), one or more metal-oxide-semiconductor capacitors (MOSCAPs), or other types of capacitors. Each of the one or more capacitors 617 is coupled to an NMOS switch MSWL and MSWR. Each of the NMOS switches MSWL and MSWR is controlled by a capacitor switching signal SWC that couples or decouples the one or more capacitors 617 to the sampling circuit 610.

The equalizing circuits 620 and the one or more capacitors 617 can help reduce the distortion on the digital signal 613 due to ISI. As discussed below with reference to FIGS. 7 and 8, the equalizing circuits 620 can compensate for the pulse width reduction on the input data signal 613, while the one or more capacitors 617 can help increase the room of compensation.

Figure 7A:
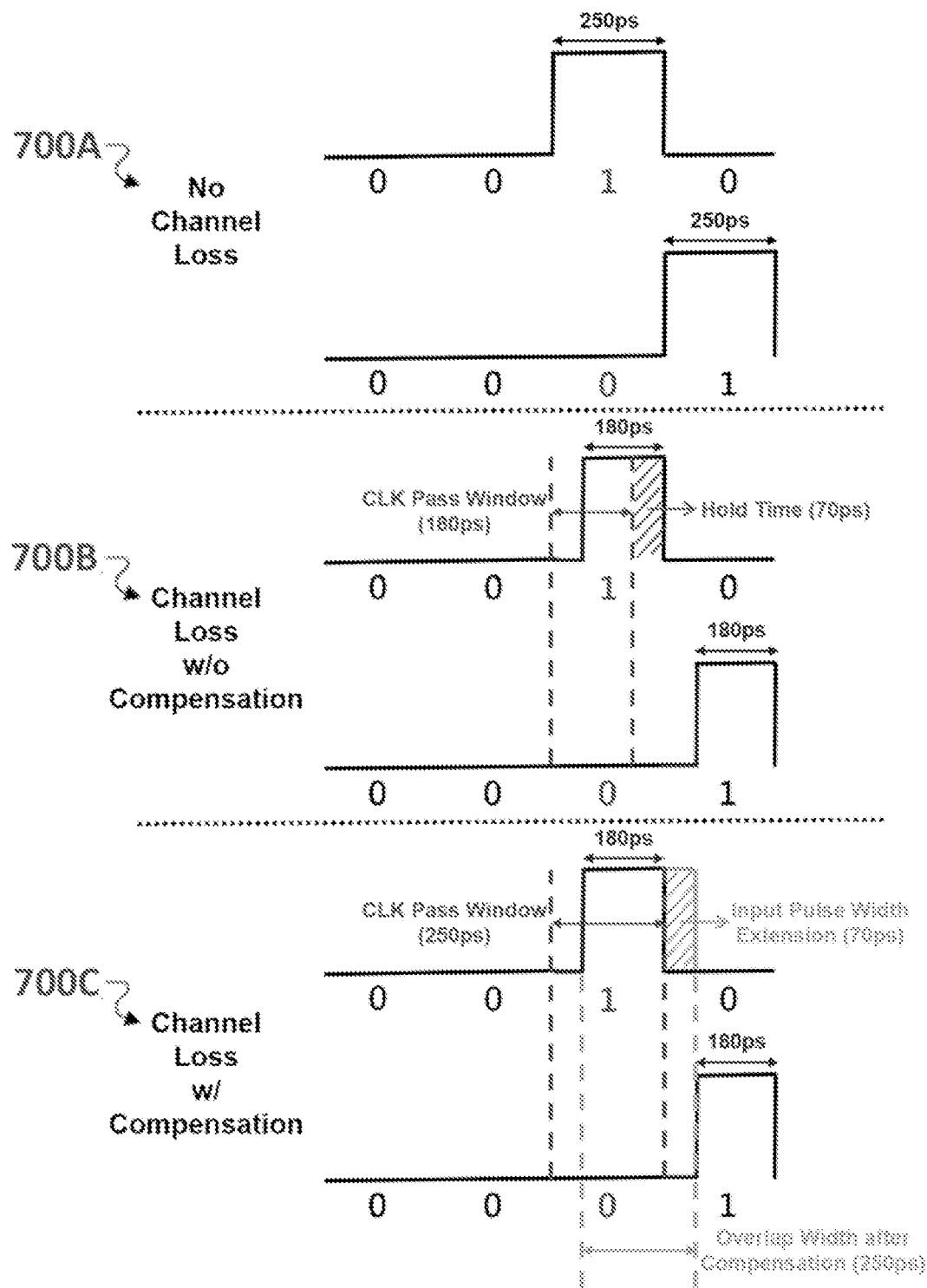
FIG. 7A illustrates a reduction of pulse width caused by ISI and a compensation for pulse width reduction.

FIG. 7A illustrates a reduction of pulse width caused by ISI. The upper part of FIG. 7A illustrates an example ideal scenario 700A where input data has no distortion after being transmitted over a data channel. Thus, after sampling, the one-bit pulse corresponding to logic 1 remains the same width one full clock cycle (e.g., 250 ps in this example).

Comparing with the ideal scenario 700A, an example non-ideal scenario 700B shows that the width of the one-bit pulse is reduced to 180 ps. Specifically, because the input data of the sampling circuit requires some hold time (e.g., 70 ps in this example) after the rising edge of the sampling clock signal CLK, the actual CLK pass window is ahead of the input signal by 70 ps.

Referring back to FIG. 6, the output feedback signals 615-1 to 615-n can help reduce the delay of the sampling circuit. For example, when the digital signal 613 switches from logic 0 to logic 1, $OUTB_{PREV1}$ has a value of logic 1. The high voltage corresponding to logic 1 at $OUTB_{PREV1}$ causes current to flow from the NMOS switches MFBL1, weighted, to the node L. With the extra current, it takes less time for the voltage at the node L to reach 0 V, thereby reducing the delay for output signal OUT being the voltage of a logic 1. Using the feedback loops to reduce the delay can be considered analogous to reduction of the sampling circuit hold time, which is equivalent to the pulse width extension of the input signal (assuming the hold time is fixed to, e.g., 70 ps). The compensation result is illustrated in scenario 700C in FIG. 7A.

Figure 7B:
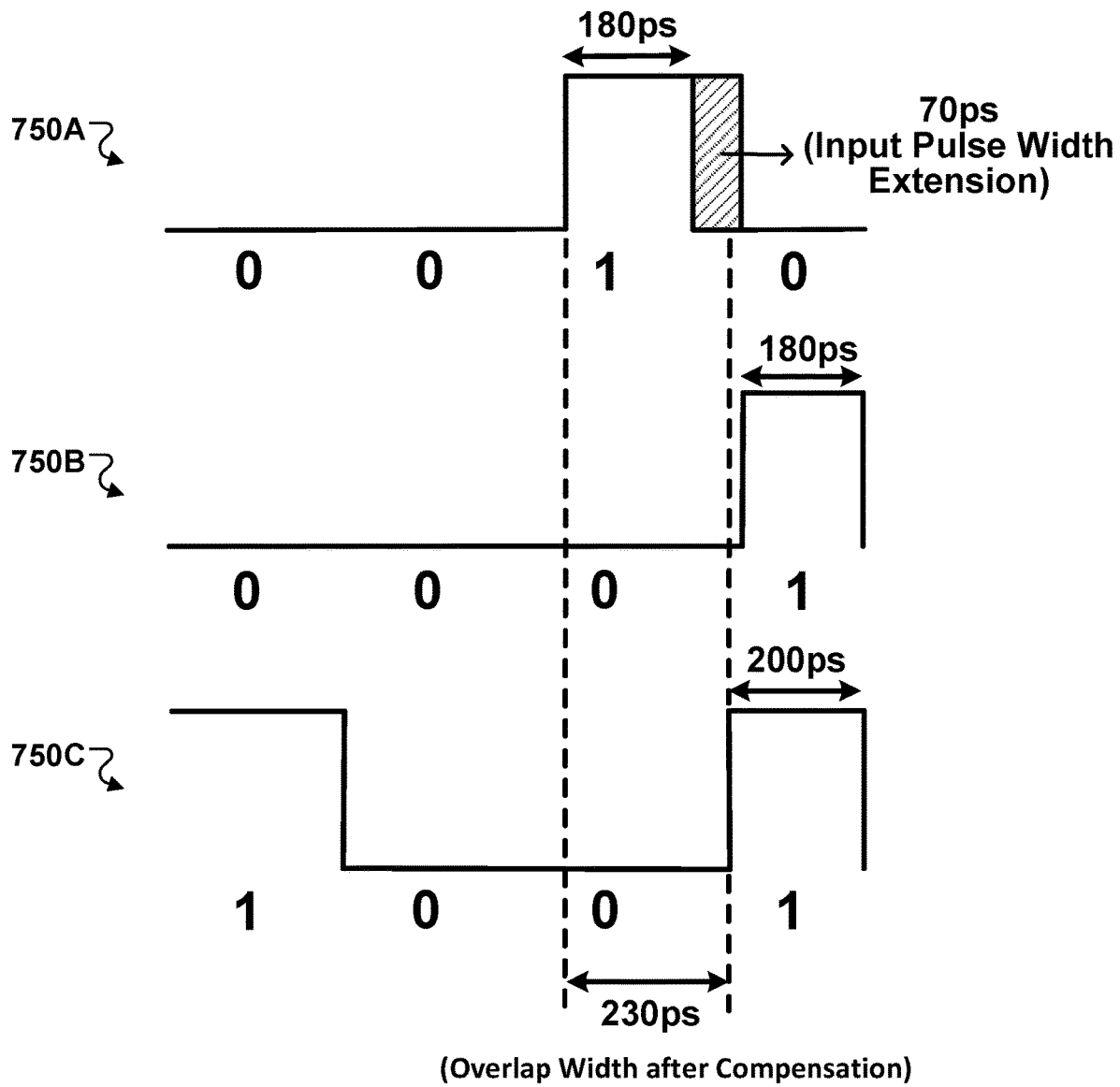
FIG. 7B illustrates a pattern effect of pulse width compensation, according to one or more implementations.

FIG. 7B illustrates a pattern effect of pulse width compensation, according to one or more implementations. The compensation with pattern effect can apply to the scenario 700B where ISI causes the pulse width to reduce from 250 ps in an ideal scenario to 180 ps.

In FIG. 7B, the waveform 750A illustrates the reduction of pulse width from 250 ps to 180 ps. The reduction is caused by ISI of the worst case.

Compared to the waveform 750B, the waveform 750C illustrates that the pulse width is increased to 200 ps because its ISI is only from previous two bits (with a value of logic 0). Thus, the third bit of waveforms 750A, 750B and 750C after compensation has an overlap width of 230 ps, a reduction by 20 ps from the ideal width 250 ps.

While feedback loops are effective in compensating for the pulse width reduction, this mechanism can have its limitation. For example, because real DFE circuits usually cannot have unlimited number of feedback loops, the compensation provided by the feedback loops usually cannot reach the full range (70 ps in the scenario 700B). Furthermore, the fabrication of components of the sampling circuit can affect the compensation space. In particular, components fabricated at typical corners and fast corners can have less hold time margins than components fabricated at slow corners. As a result, components fabricated at typical corners and fast corners can reduce the range for potential compensation, making it more challenging for the compensation circuit 600 to compensate for the pulse width reduction.

Using the one or more capacitors 617 can improve the compensation performance at typical corners and fast corners. For example, by activating the NMOS switches MSWL and MSWR using the capacitor switching signal SWC, the one or more capacitors 617 are connected to the sampling circuit 610. The charge storage effect of the one or more capacitors 617 can increase the hold time margin of the sampling circuit 610 and thereby increase the room for potential compensation.

FIG. 8 illustrates a table 800 showing example compensation effect of pulse width reduction. The compensation effect in table 800 can be obtained by applying a strong arm latch comparator with 1-tap compensation circuit 600 to a variety of scenarios (including a scenario where the full clock cycle is 250 ps and the worst pulse width is 180 ps without compensation).

According to the table 800, in both fast corner and typical corner components, connecting one capacitor 617 to the sampling circuit 610 can improve the compensation effect. Specifically, with the capacitor 617 connected to the sampling circuit 610 (i.e., SWC=1), the pulse width is increased from 205 ps to 230 ps in fast corner components, and is increased from 210 ps to 230 ps in typical corner components. For slow corner components, the pulse width is 230 ps with the capacitor 617 disconnected from the sampling circuit 610 (e.g., SWC=0). In all scenarios, the one equalizing circuit 620 and the one capacitor 617 can improve the pulse width from 180 ps to 230 ps. When more equalizing circuits 620 are available, the pulse width reduction can be further compensated. Accordingly, after the fabrication of a memory device circuit that implements the strong arm latch comparator with compensation circuit for DFE, a user can control the capacitor switching signal SWC to achieve the desired pulse width compensation depending on which corner the memory device circuit falls in.

Figure 9A:
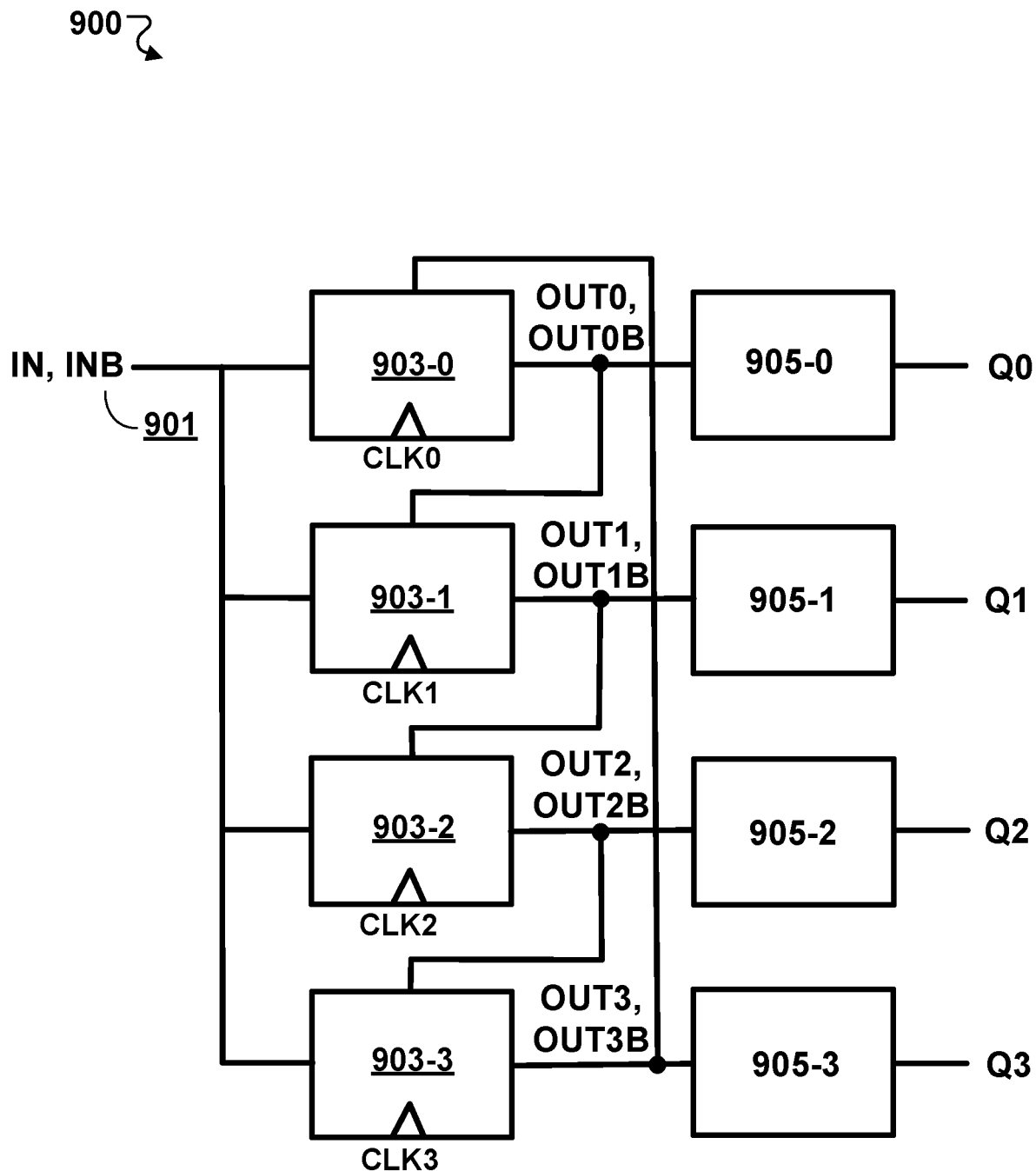
FIG. 9A illustrates an example quarter-rate one-tap DFE circuit with latched output, according to one or more implementations.

FIG. 9A illustrates an example quarter-rate one-tap DFE circuit 900 with latched output, according to one or more implementations. The quarter-rate one-tap DFE circuit 900 can function similarly to the Sample & Latch circuit 308 of the architecture 300 of FIG. 3A.

In some implementations, the quarter-rate one-tap DFE circuit 900 has four strong arm latch comparator with compensation circuits 903-0 to 903-3 (collectively referred to as strong arm latch comparator with compensation circuits 903 and individually referred to as strong arm latch comparator with compensation circuit 903). Each strong arm latch comparator with compensation circuit 903 can be the same as, or similar to, the circuit 600. The four strong arm latch comparator with compensation circuits 903 receive the same digital signal 901, which can include a pair of differential digital signals IN and INB. The four strong arm latch comparator with compensation circuits 903 each generate an output signal, OUT0 to OUT3, respectively. The output signal generated by one strong arm latch comparator with compensation circuit 903 is fed back to another strong arm latch comparator with compensation circuit 903. That is, OUT0 is fed back to the strong arm latch comparator with compensation circuit 903-1. OUT1 is fed back to the strong arm latch comparator with compensation circuit 903-2, OUT2 is fed back to the strong arm latch comparator with compensation circuit 903-3, and OUT3 is fed back to the strong arm latch comparator with compensation circuit 903-0. The four strong arm latch comparator with compensation circuits 903 can further each generate an inverted output signal, OUT0B to OUT3B, respectively, which correspond to output signals OUT0 to OUT3.

The operations of the strong arm latch comparator with compensation circuits 903 can be synchronized with clock signals CLK0 to CLK3, each driving a corresponding compensation circuit 903. The clock signals CLK0 to CLK3 have the same clock cycle length but differ by 90 degrees in phase. For example, CLK0 is ahead of CLK1 by a quarter of the cycle length, CLK1 is ahead of CLK2 by a quarter of the cycle length, and CLK2 is ahead of CLK3 by a quarter of the cycle length. The frequency of CLK0 to CLK3 is a quarter of the data rate of the digital signal 901. Thus, each strong arm latch comparator with compensation circuit 903 performs sampling and compensation on the digital signal 901 every four bits.

The output signals OUT0 to OUT3 of the compensation circuits 903 can be latched by four latch circuits 905-0 to 905-3 (collectively referred to as latch circuits 905 and individually referred to as latch circuit 905) for a period of time for stabilization. The latch circuits 905-0 to 905-3 each output a latch output, Q0 to Q3, respectively. In some examples, each latch circuit 905 includes a set/reset (SR) latch having two inputs for receiving two opposite signals OUT, OUTB and two outputs for outputting two opposite signals Q and QB. The quarter-rate one-tap DFE circuit 900 can use the quarter clock rate to bypass the SR latch delay and improve feedback delay.

Figure 9B:
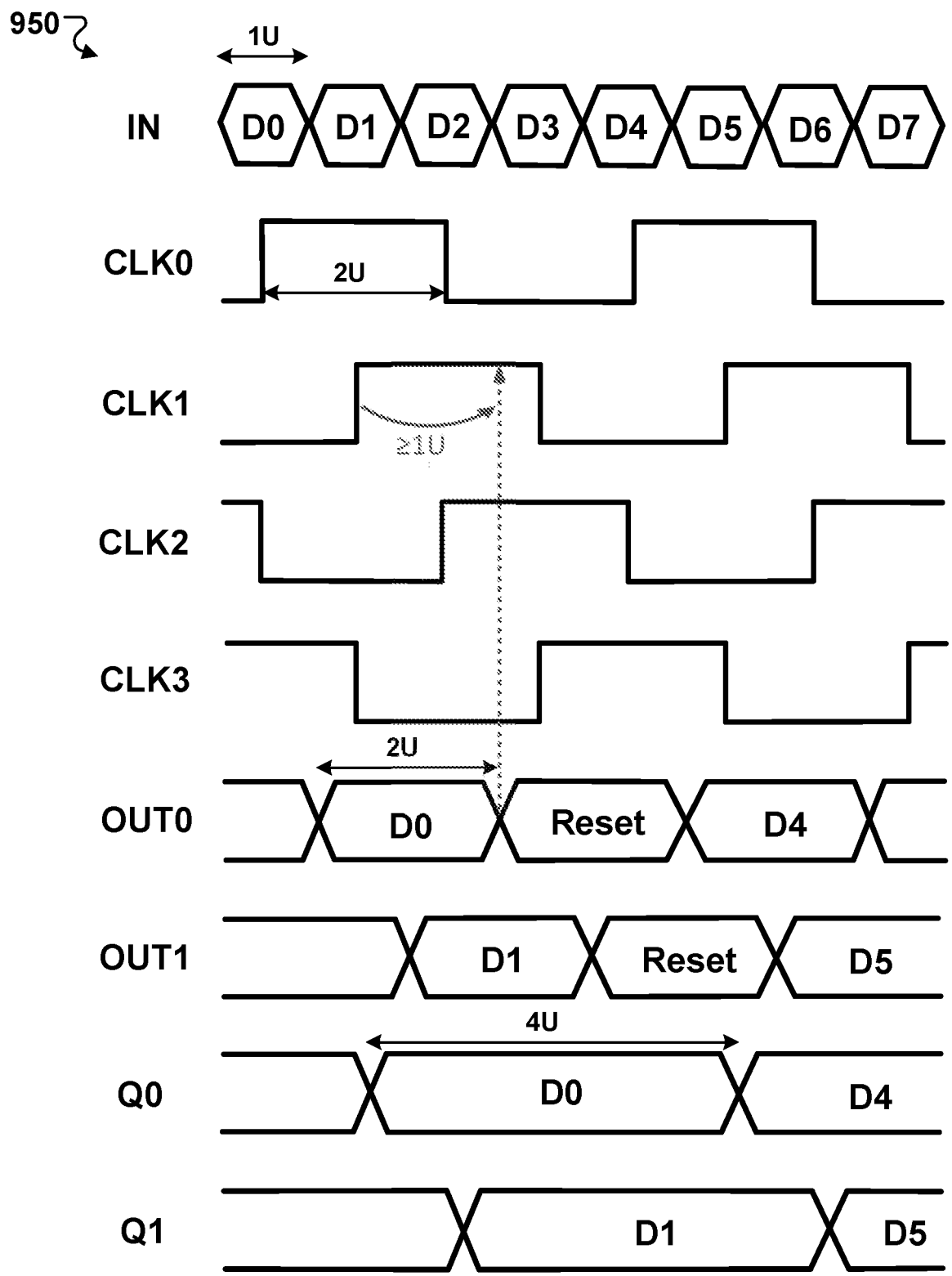
FIG. 9B illustrates an example timing diagram of the quarter-rate one-tap DFE circuit of FIG. 9A, according to one or more implementations.

FIG. 9B illustrates an example timing diagram 950 of the quarter-rate one-tap DFE circuit of FIG. 9A, according to one or more implementations. The timing diagram 950 assumes that the digital signal IN has a rate of one bit per time unit (1 U).

As described previously, the clock signals CLK0 to CLK3 each have a frequency equal to a quarter of the data rate of the digital signal IN. Accordingly, CLK0 to CLK3 each has a cycle length equal to 4 U (2 U at logic 1 and 2 U at logic 0). CLK0 is ahead of CLK1 by 1 U, CLK1 is ahead of CLK2 by a 1 U, and CLK2 is ahead of CLK3 by 1 U.

Driven by CLK0-CLK3, each of the strong arm latch comparator with compensation circuit 903 samples the digital signal IN at a rate of one bit per 4 U and outputs the sampled data on the output signal OUT0 to OUT3, respectively. Because sampling only occurs when the clock signals CLK0-CLK3 are high, OUT0 to OUT3 have valid sampled data for 2 U in a clock cycle and are reset (e.g., by the reset switches MP4 and MP5 in the compensation circuit 600) during the other 2 U in the same clock cycle. For example, as shown in the timing diagram 950, OUT0 has sampled data D0 during 2 U of a clock cycle of CLK0, and is reset during the other 2 U of the same clock cycle. In the next clock cycle, OUT0 has sampled data D4, which is sampled 4 bits after D0. Similarly, OUT1 has sampled data D1 during 2 U of a clock cycle of CLK1, is reset for 2 U, and then has sampled data D5 in the next clock cycle of CLK1. The data on the output signals OUT2 and OUT3 can be similarly obtained.

The output signals OUT0 to OUT3 are then latched and become latch outputs Q0 to Q3, respectively. In the timing diagram 950, the latch takes 4 U for each bit of data. As a result, the latch instance 905-0 outputs D0 on the latch output Q0 for 4 U, followed by D4 for another 4 U. Similarly, the latch instance 905-1 outputs D1 on the latch output Q1 for 4 U, followed by D5 for another 4 U. The data on the latch outputs Q2 and Q3 can be similarly obtained.

The quarter-rate one-tap DFE circuit 900 can be helpful for compensating for data distortion in high speed applications. Because the feedback signal being passed to the next strong arm latch comparator with compensation circuit 903 requires some hold time after the rising edge of next clock signal, and the output signal of circuit 903 has valid sampled data for at least 1 U after the rising edge of next clock signal, the quarter-rate one-tap DFE circuit 900 can use the output signal of circuit 903 to be fed back, which doesn't need to pass the latch instance 905 and has shorter feedback delay. With less stringent feedback delay requirements, the compensation circuits can, e.g., use more taps to improve the compensation performance.

Although FIGS. 9A and 9B describe a quarter-rate one-tap DFE circuit design, some implementations can have DFE of other rates. For example, some implementations can have two, eight, or sixteen strong arm latch comparator with compensation circuits, driven by clock signals with frequencies equal to one half, one eighth, or one sixteenth of the data rate.

Figure 10:
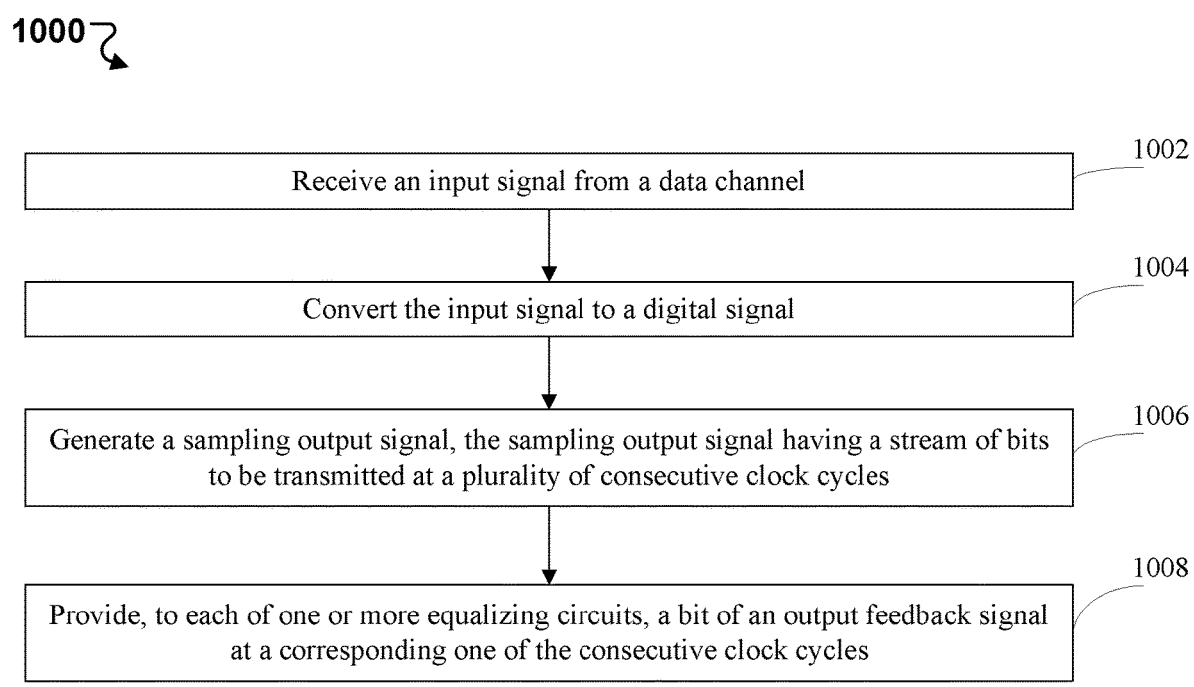
FIG. 10 illustrates a flowchart of an example method, according to one or more implementations.

FIG. 10 illustrates a flowchart of a process 1000 of an example method, according to one or more implementations. The process 1000 can be performed by, e.g., the receiver with DFE circuit 400 of a memory device. With the performance of the process 1000, the memory device can compensate for data distortion from channel loss such as ISI.

At 1002, an input signal is received from a data channel. The input signal can be same as, or similar to, the input signal 411 of FIG. 4.

At 1004, the input signal is converted to a digital signal. The digital signal can be same as, or similar to, the digital signal 413 of FIG. 4, the digital signal 613 of FIG. 6, or the digital signal 901 of FIG. 9A.

At 1006, a sampling output signal is generated. The sampling output signal can include a stream of bits to be transmitted at a plurality of consecutive clock cycles. The sampling output signal can be same as, or similar to, the output signal 414 of FIG. 4, the output signal 614 of FIG. 6, or the output signals OUT0 to OUT3 of FIG. 9A. The transmission of the stream of bits can be fed back to the equalizing circuits 620 as $OUT_{PREV1}$ to $OUT_{PREVn}$ and $OUTB_{PREV1}$ to $OUTB_{PREVn}$.

At 1008, each of one or more equalizing circuits is provided a bit of output feedback at one of the consecutive clock cycles. The providing of the bit of output feedback can be same as, or similar to, providing $OUT_{PREV1}$ to $OUT_{PREVn}$ and $OUTB_{PREV1}$ to $OUTB_{PREVn}$ to the equalizing circuits 620 in FIG. 6. A sum of equalization outputs of the one or more equalizing circuits, along with the digital signal, is used to generate the sampling output signal.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An electronic circuit, comprising:
a converter circuit configured to convert an input signal to a digital signal, wherein the converter circuit comprises: a current mode logic (CML) circuit configured to generate a CML signal based on the input signal, and a CML-to-digital converter circuit configured to convert the CML signal to the digital signal; and
a compensation circuit coupled to the converter circuit, the compensation circuit comprising:
a sampling circuit configured to receive the digital signal and generate an output signal, the output signal comprising a stream of bits to be transmitted at a plurality of consecutive clock cycles; and
one or more equalizing circuits coupled to the sampling circuit, each of the one or more equalizing circuits being configured to receive a bit of an output feedback signal at a corresponding one of the consecutive clock cycles and generate a corresponding equalization output,
wherein the sampling circuit is configured to generate the output signal based on the digital signal and a sum of one or more equalization outputs of the one or more equalizing circuits.

2. The electronic circuit of claim 1, wherein the sum of the one or more equalization outputs comprises a weighted sum.

3. The electronic circuit of claim 1, further comprising: one or more capacitors coupled to the sampling circuit in parallel to the one or more equalizing circuits.

4. The electronic circuit of claim 1, wherein a pulse width of the output signal is different from a pulse width of the input signal.

5. The electronic circuit of claim 1, further comprising: a latch circuit configured to receive the output signal and output a latch output.

6. The electronic circuit of claim 1, wherein:
the sampling circuit comprises a first N-type metal-oxide-semiconductor (NMOS) switch,
the sampling circuit is configured to receive the digital signal at a gate terminal of the first NMOS switch,
the one or more equalizing circuits are coupled to a drain terminal of the first NMOS switch, and
the one or more capacitors are coupled to the drain terminal of the first NMOS switch.

7. The electronic circuit of claim 6, wherein:
the sampling circuit further comprises a second NMOS switch, and
the sampling circuit is configured to receive an inverted digital signal at a gate terminal of the second NMOS switch.

8. The electronic circuit of claim 7, wherein:
the sampling circuit further comprises a charge sharing NMOS switch,
a gate terminal of the charge sharing NMOS switch is coupled to a constant voltage source,
a first terminal of the charge sharing NMOS switch is coupled to the drain terminal of the first NMOS switch, and
a second terminal of the charge sharing NMOS switch is coupled to a drain terminal of the second NMOS switch, wherein the first terminal is one of a drain terminal and a source terminal, and the second terminal is the other one of the drain terminal and the source terminal.

9. The electronic circuit of claim 6, wherein:
the sampling circuit further comprises one or more reset switches,
a gate terminal of each of the one or more reset switches is driven by a clock signal,
a drain terminal of each of the one or more reset switches is coupled to the first NMOS switch, and
a source terminal of each of the one or more reset switches is coupled to a constant voltage source or a ground.

10. The electronic circuit of claim 1, wherein each of the one or more equalizing circuits comprises:
a first feedback switch configured to receive the bit of the output feedback signal;
a second feedback switch configured to receive a logic opposite of the bit of the output feedback signal; and
one or more weighting control switches configured to receive a weighting control signal.

11. The electronic circuit of claim 10, wherein the one or more weighting control switches are configured to connect the first feedback switch and the second feedback switch to a plurality of weighting switches based on the weighting control signal.

12. The electronic circuit of claim 10, wherein the one or more weighting control switches are configured to connect the first feedback switch and the second feedback switch to one or more current mirror circuits based on the weighting control signal.

13. The electronic circuit of claim 1, wherein the compensation circuit is a first compensation circuit, and the sampling circuit is a first sampling circuit, and
wherein the electronic circuit further comprises a second compensation circuit, and the second compensation circuit comprises a second sampling circuit configured to receive the digital signal and generate the output feedback signal at the plurality of consecutive clock cycles.

14. The electronic circuit of claim 13, further comprising: a first latch circuit coupled to the first compensation circuit; and a second latch circuit coupled to the second compensation circuit, wherein:
the first latch circuit is configured to output a first latch output, and
the second latch circuit is configured to output a second latch output.

15. The electronic circuit of claim 14, further comprising a third compensation circuit and a fourth compensation circuit, wherein:
the first compensation circuit is driven by a first clock signal, the second compensation circuit is driven by a second clock signal, the third compensation circuit is driven by a third clock signal, and the fourth compensation circuit is driven by a fourth clock signal,
the first clock signal, the second clock signal, the third clock signal, and the fourth clock signal have a same cycle length,
the first clock signal is ahead of the second clock signal by a quarter of the cycle length,
the second clock signal is ahead of the third clock signal by a quarter of the cycle length, and
the third clock signal is ahead of the fourth clock signal by a quarter of the cycle length.

16. A memory device comprising:
a memory interface circuit coupled to a data channel;
a memory cell array;
a data buffer circuit; and
a control logic circuit coupled to the memory interface circuit, the memory cell array, and the data buffer circuit,
wherein the data buffer circuit comprises:
a converter circuit configured to receive an input signal from the memory interface circuit and convert the input signal to a digital signal; and
a compensation circuit coupled to the converter circuit, the compensation circuit comprising:
a sampling circuit configured to receive the digital signal and generate an output signal, the output signal comprising a stream of bits to be transmitted at a plurality of consecutive clock cycles; and
one or more equalizing circuits coupled to the sampling circuit, each of the one or more equalizing circuits being configured to receive a bit of an output feedback signal at a corresponding one of the consecutive clock cycles and generate a corresponding equalization output,
wherein the sampling circuit is configured to generate the output signal based on the digital signal and a sum of one or more equalization outputs of the one or more equalizing circuits, and
wherein the sampling circuit comprises an N-type metal-oxide-semiconductor (NMOS) switch, the sampling circuit is configured to receive the digital signal at a gate terminal of the NMOS switch, the one or more equalizing circuits are coupled to a drain terminal of the NMOS switch, and one or more capacitors are coupled to the drain terminal of the NMOS switch.

17. The memory device of claim 16, wherein the data buffer circuit comprises a plurality of compensation circuits including the compensation circuit, each of the plurality of compensation circuits comprising a respective sampling circuit and at least one respective equalizing circuit configured to receive an output feedback signal from an output of a different compensation circuit among the plurality of compensation circuits.

18. The memory device of claim 17, wherein the data buffer circuit further comprises a plurality of latch circuits, each latch circuit being coupled to a respective compensation circuit of the plurality of compensation circuits and configured to receive an output signal from the respective compensation circuit and output a latch output signal.

19. A method for compensating for data distortion from channel loss, the method comprising:
receiving an input signal from a data channel;
converting the input signal to a digital signal;
generating a sampling output signal, the sampling output signal comprising a stream of bits to be transmitted at a plurality of consecutive clock cycles; and
providing, to each of one or more equalizing circuits, a bit of an output feedback signal at a corresponding one of the consecutive clock cycles,
wherein the sampling output signal is generated based on the digital signal and a sum of one or more equalization outputs of the one or more equalizing circuits, and
wherein each of the one or more equalizing circuits comprises: a first feedback switch configured to receive the bit of the output feedback signal, a second feedback switch configured to receive a logic opposite of the bit of the output feedback signal, and one or more weighting control switches configured to receive a weighting control signal.

20. An electronic circuit, comprising:
a converter circuit configured to convert an input signal to a digital signal; and
a compensation circuit coupled to the converter circuit, the compensation circuit comprising:
a sampling circuit configured to receive the digital signal and generate an output signal, the output signal comprising a stream of bits to be transmitted at a plurality of consecutive clock cycles; and
one or more equalizing circuits coupled to the sampling circuit, each of the one or more equalizing circuits being configured to receive a bit of an output feedback signal at a corresponding one of the consecutive clock cycles and generate a corresponding equalization output,
wherein the sampling circuit is configured to generate the output signal based on the digital signal and a sum of one or more equalization outputs of the one or more equalizing circuits,
wherein the compensation circuit is a first compensation circuit, and the sampling circuit is a first sampling circuit, and wherein the electronic circuit further comprises a second compensation circuit, and the second compensation circuit comprises a second sampling circuit configured to receive the digital signal and generate the output feedback signal at the plurality of consecutive clock cycles.

* * * * *